United States Patent
Mun et al.

(10) Patent No.: US 8,837,946 B2
(45) Date of Patent: Sep. 16, 2014

(54) DATA TRANSMISSION APPARATUS AND METHOD FOR USE IN SEPARATE-TYPE BASE STATION

(75) Inventors: Sil-Gu Mun, Daejeon-si (KR); Eui-Suk Jung, Daejeon-si (KR); Sang-Soo Lee, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 249 days.

(21) Appl. No.: 13/334,108

(22) Filed: Dec. 22, 2011

(65) Prior Publication Data

US 2012/0163819 A1 Jun. 28, 2012

(30) Foreign Application Priority Data

Dec. 23, 2010 (KR) .................. 10-2010-0133806

(51) Int. Cl.
| | |
|---|---|
| *H04J 4/00* | (2006.01) |
| *H04B 10/00* | (2013.01) |
| *H04J 14/02* | (2006.01) |
| *H04B 10/2575* | (2013.01) |
| *H04W 88/08* | (2009.01) |

(52) U.S. Cl.
CPC ......... *H04J 14/0282* (2013.01); *H04J 14/0257* (2013.01); *H04W 88/08* (2013.01); *H04B 10/25753* (2013.01)
USPC ............................................ 398/75; 398/115

(58) Field of Classification Search
None
See application file for complete search history.

(56) References Cited

U.S. PATENT DOCUMENTS

| | | | |
|---|---|---|---|
| 6,731,875 B1 * | 5/2004 | Kartalopoulos | 398/68 |
| 2007/0177552 A1 | 8/2007 | Wu et al. | |
| 2009/0010650 A1 * | 1/2009 | Tsuchiya et al. | 398/59 |
| 2010/0098433 A1 * | 4/2010 | Boyd et al. | 398/155 |

FOREIGN PATENT DOCUMENTS

KR 10-2009-0116112 A 11/2009

* cited by examiner

*Primary Examiner* — Shi K Li
*Assistant Examiner* — Mina Shalaby
(74) *Attorney, Agent, or Firm* — Rabin & Berdo P.C.

(57) ABSTRACT

A data transmission apparatus for use in a separate-type base station is provided. The data transmission apparatus includes: a digital unit configured to generate first data that includes transmission method information indicating a selected transmission method and data to be transmitted; a time-division synchronization control unit configured to, in response to the selected transmission method being time-division multiplexing (TDM), generate second data by including synchronization information for transmitting the first data using TDM in the first data; and a wavelength conversion unit configured to convert at least one of the first data and the second data into one or more wavelength optical signals using a predefined wavelength or a predefined group of wavelengths and transmit the wavelength optical signals to one or more radio stations.

15 Claims, 3 Drawing Sheets

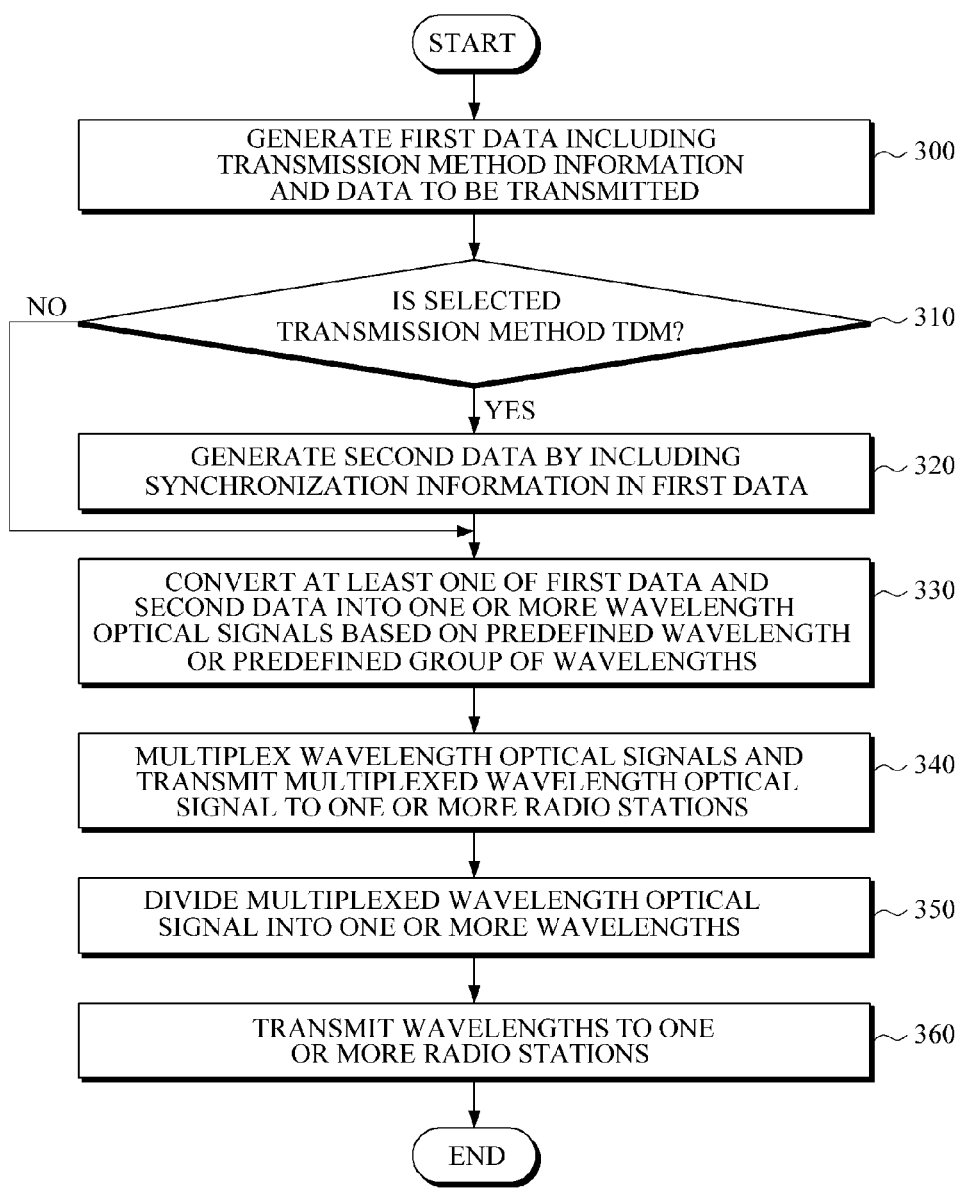

DATA TRANSMISSION APPARATUS AND METHOD FOR USE IN SEPARATE-TYPE BASE STATION

CROSS-REFERENCE TO RELATED APPLICATION(S)

This application claims the benefit under 35 U.S.C. §119 (a) of Korean Patent Application No. 10-2010-0133806, filed on Dec. 23, 2010, in the Korean Intellectual Property Office, the entire disclosure of which is incorporated herein by reference for all purposes.

BACKGROUND

1. Field

The following description relates to a data transmission technique for use in a separate-type base station that uses both wavelength-division multiplexing (WDM) and time-division multiplexing (TDM).

2. Description of the Related Art

Since the advent of smart phones in the market, wireless data traffic has been expected to at least double every year due to the use of a variety of applications, and domestic and international communication providers have long discussed the future evolution of network technologies capable of reducing costs and making efficient use of communication system resources.

Typical wireless networks are equipped with various software and base stations, including hardware equipment for providing various services such as, for example, High-Speed Packet Access (HSPA), Code Division Multiple Access (CDMA), Worldwide Interoperability for Microwave Access (WiMAX), and the like, and may be inefficient in terms of maintenance and operation. To address this problem, a digital unit and a radio unit that are generally installed together in a mobile communication base station may be separated from each other, the digital unit may be installed in a telephone office, and only the radio unit may be installed in the mobile communication base station.

Since the digital unit and the radio unit are connected in a point-to-point manner and the digital unit and the radio unit transmit data using the same medium, it may be difficult to perform multiplexing. In addition, the digital unit and the radio unit may use the same wavelengths. In a case in which the digital unit is hierachized, the transmission speed of the digital unit may be considerably affected by the degree of hierarchization of the digital unit. Moreover, since the transmission of data via the radio unit is affected by a minimum amount of time required for synchronization, the radio unit may have a limited transmission distance.

SUMMARY

In one general aspect, there is provided a data transmission apparatus for use in a separate-type base station, the data transmission apparatus including: a digital unit configured to generate first data that includes transmission method information indicating a selected transmission method and data to be transmitted; a time-division synchronization control unit configured to, in response to the selected transmission method being time-division multiplexing (TDM), generate second data by including synchronization information for transmitting the first data using TDM in the first data; and a wavelength conversion unit configured to convert at least one of the first data and the second data into one or more wavelength optical signals using a predefined wavelength or a predefined group of wavelengths and transmit the wavelength optical signals to one or more radio stations.

The digital unit may be further configured to, in response to a selection signal being received via a user input unit, generate at least one of TDM data, which includes transmission method information indicating TDM, TDM/WDM data, which includes transmission method information indicating both TDM and WDM, and WDM data, which includes transmission method information indicating WDM, as the first data based on the selection signal.

The time-division synchronization control unit may be further configured to include the synchronization information in the TDM data and the TDM/WDM data.

The wavelength conversion unit may be further configured to transmit the TDM data using a first wavelength, transmit the TDM/WDM data using a first group of wavelengths, and transmit the WDM data using a second group of wavelengths.

The data transmission apparatus may further include a multiplexing unit configured to multiplex the wavelength optical signals and transmit a multiplexed wavelength optical signal obtained by the multiplexing the wavelength optical signals to the radio stations.

The data transmission apparatus may further include a division unit configured to receive the multiplexed wavelength optical signal from the multiplexing unit, divide the multiplexed wavelength optical signal into one or more wavelengths, and transmit the wavelengths to the radio stations.

The division unit may be a demultiplexer or a splitter.

The radio stations may include least one of a TDM radio station, a TDM/WDM radio station, and a WDM radio station.

The data transmission apparatus may further include a division unit configured to receive the multiplexed wavelength optical signal from the multiplexing unit, divide the multiplexed wavelength optical signal into a first wavelength, a first group of wavelengths and a second group of wavelengths, and transmit the first wavelength, the first group of wavelengths, and the second group of wavelengths to the TDM radio station, the TDM/WDM radio station, and the WDM radio station, respectively.

In another general aspect, there is provided a data transmission apparatus for use in a separate-type base station, the data transmission method including: generating first data that includes transmission method information indicating a selected transmission method and data to be transmitted; in response to the selected transmission method being TDM, generating second data by including synchronization information for transmitting the first data using TDM in the first data; and converting at least one of the first data and the second data into one or more wavelength optical signals using a predefined wavelength or a predefined group of wavelengths and transmit the wavelength optical signals to one or more radio stations.

The generating of the first data may include, in response to a selection signal being received via a user input unit, generating at least one of TDM data, which includes transmission method information indicating TDM, TDM/WDM data, which includes transmission method information indicating both TDM and WDM, and WDM data, which includes transmission method information indicating WDM, as the first data based on the selection signal.

The generating of the second data include including the synchronization information in the TDM data and the TDM/WDM data.

The converting of the at least one of the first data and the second data may include transmitting the TDM data using a first wavelength, transmitting the TDM/WDM data using a first group of wavelengths, and transmitting the WDM data using a second group of wavelengths.

The data transmission method may further include multiplexing the wavelength optical signals and transmitting a multiplexed wavelength optical signal obtained by the multiplexing the wavelength optical signals to the radio stations.

The data transmission method may further include dividing the multiplexed wavelength optical signal into one or more wavelengths; and transmitting the wavelengths to the radio stations.

The radio stations may include at least one of a TDM radio station, a TDM/WDM radio station, and a WDM radio station.

The data transmission method may further include dividing the multiplexed wavelength optical signal into a first wavelength, a first group of wavelengths and a second group of wavelengths, and transmitting the first wavelength, the first group of wavelengths, and the second group of wavelengths to the TDM radio station, the TDM/WDM radio station, and the WDM radio station, respectively.

Other features and aspects may be apparent from the following detailed description, the drawings, and the claims.

BRIEF DESCRIPTION OF THE DRAWINGS

FIG. 3 is a flowchart illustrating an example of a data transmission method for use in a separate-type base station.

Figure 1:
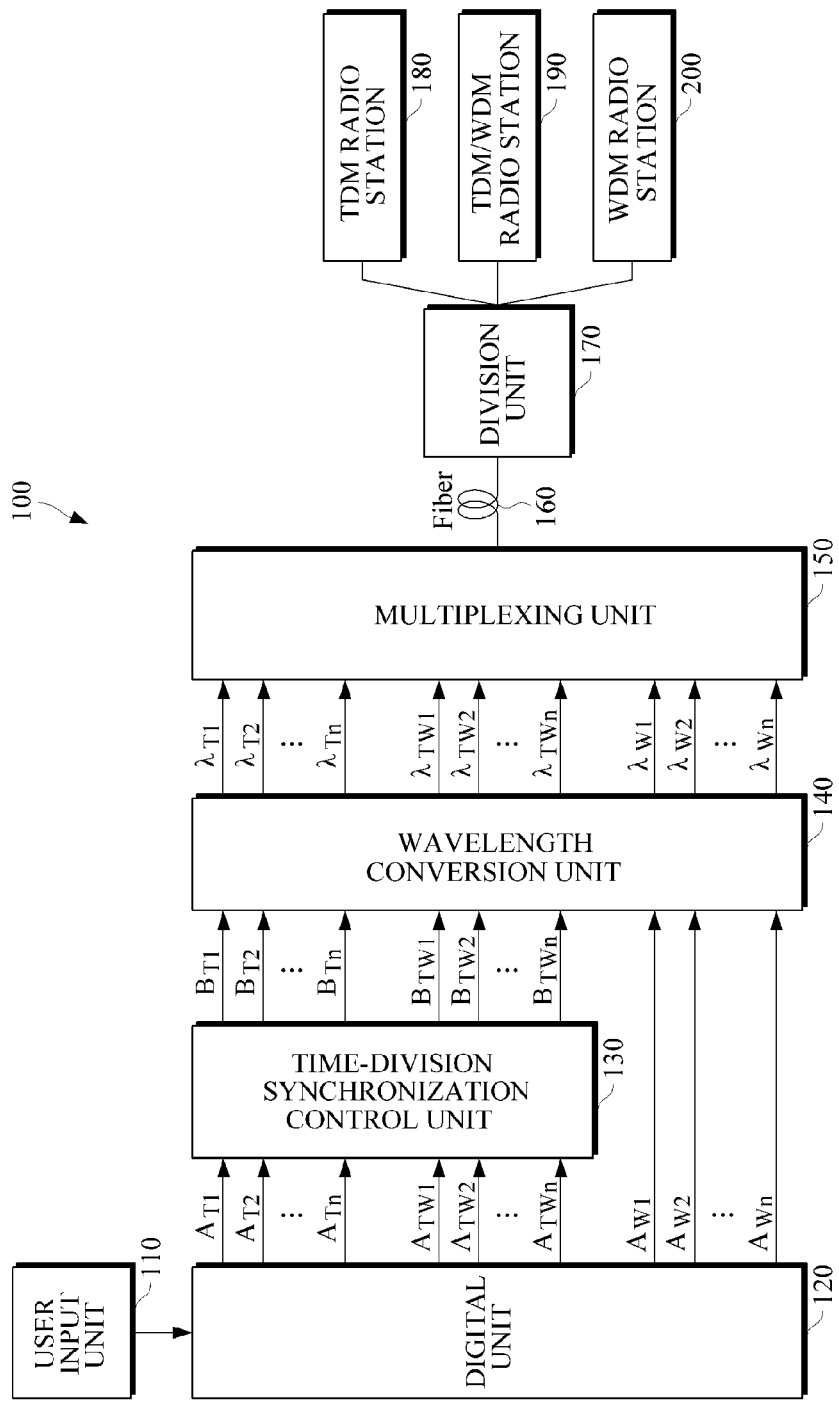
FIG. 1 is a diagram illustrating an example of a data transmission apparatus for use in a separate-type base station.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a data transmission apparatus for use in a separate-type base station.

Referring to FIG. 1, data transmission apparatus 100 includes a user input unit 110, a digital unit 120, a time-division synchronization control unit 130, a wavelength conversion unit 140, a multiplexing unit 150, an optical fiber 160, a division unit 170, a time-division multiplexing (TDM) 180, a TDM/wavelength-division multiplexing (WDM) radio station 190, and a WDM radio station 200.

The user input unit 110 may allow a user to enter a selection signal for selecting a transmission method. For example, the user input unit 110 may be a keypad, a dome switch, a touchpad (for example, static pressure/capacitance), a jog wheel, a jog switch, or the like.

The digital unit 120 may process a baseband signal. For example, the digital unit 120 may include a digital signal processor (not shown) and a serializer/deserializer (SerDes) (not shown). The digital unit 120 may also be referred to as a radio equipment controller. The digital unit 120 may be installed in a communication service provider.

The digital unit 120 may generate first data including transmission method information indicating a selected transmission method and data to be transmitted. The selected transmission method may be a transmission method that is either selected by the selection signal or automatically selected by the digital unit 120 according to the communication circumstances of the data transmission apparatus 100. The first data may be represented in units of frames. The transmission method information may be information on a transmission method that is selected by the selection signal, and the data to be transmitted may be data that the user wishes to transmit.

For example, the digital unit 120 may generate at least one of the following data: TDM data ($A_{T1}, \ldots, A_{Tn}$) including information indicating that the selected transmission method is TDM; TDM/WDM data ($A_{TW1}, \ldots, A_{TWn}$) including information indicating that the selected transmission method is TDM and WDM; and WDM data ($A_{W1}, \ldots, A_{Wn}$) including information indicating that the selected transmission method is WDM.

For example, if the selection signal indicates that the selected transmission method is TDM, the digital unit 120 may generate TDM data including information indicating that the selected transmission method is TDM. In this example, the information indicating that the transmission method selected by the selection signal is TDM and data to be transmitted using TDM may be represented in units of frames.

In another example, if the selection signal indicates that the selected transmission method is both TDM and WDM, the digital unit 120 may generate TDM/WDM data including information indicating that the selected transmission method is TDM and WDM. In this example, the information indicating that the selected transmission method is TDM and WDM and data to be transmitted using both TDM and WDM may be represented in units of frames.

In yet another example, if the selection signal indicates WDM, the digital unit 120 may generate WDM data including information indicating that the selected transmission method is WDM. In this example, the information indicating that the transmission method selected by the selection signal is WDM and data to be transmitted using WDM may be represented in units of frames.

In short, the user may choose one transmission method or two or more transmission methods.

In response to the selected transmission method being TDM, the time-division synchronization control unit 130 may include synchronization information that is necessary for transmitting the first data using TDM in the first data, thereby generating second data.

For example, the time-division synchronization control unit 130 may generate new data by including synchronization information in TDM data ($B_{T1}, \ldots, B_{Tn}$) and TDM/WDM data ($B_{TW1}, \ldots, B_{TWn}$) that are generated by the digital unit 120.

The wavelength conversion unit 140 may convert at least one of the first data and the second data into one or more wavelength optical signals using a predefined wavelength or a predefined group of wavelengths, and may transmit the wavelength optical signals to the TDM, TDM/WDM, and WDM radio stations 180, 190, and 200 via the optical fiber 160. For example, the wavelength conversion unit 140 may convert at least one of the WDM data ($A_{W1}, \ldots, A_{Wn}$), the TDM data ($B_{T1}, \ldots, B_{Tn}$) and the TDM/WDM data ($B_{TW1}, \ldots, B_{TWn}$) into one or more wavelength optical signals, and may transmit the wavelength optical signals to the TDM, TDM/WDM, and WDM radio stations 180, 190, and 200 via the optical fiber using a predefined wavelength or a predefined group of wavelengths.

The wavelength conversion unit 140 may transmit data to the TDM, TDM/WDM, and WDM radio stations 180, 190, and 200 via the optical fiber 160 using a predefined wavelength. For example, the wavelength conversion unit 140 may transmit the TDM data ($B_{T1}, \ldots, B_{Tn}$) using a first wavelength $\lambda_T$, may transmit the TDM/WDM data ($B_{TW1}, \ldots, B_{Tn}$) using a first group of wavelengths ($\lambda_{TW1}, \ldots, \lambda_{TWn}$), and may transmit the WDM data ($A_{W1}, \ldots, A_{Wn}$) using a second group of wavelengths ($\lambda_{W1}, \ldots, \lambda_{Wn}$).

The multiplexing unit 150 may multiplex the wavelength-converted first data and the wavelength-converted second data, and may transmit the result of the multiplexing to the TDM, TDM/WDM, and WDM radio stations 180, 190, and 190 via the optical fiber 160. For example, the multiplexing unit 150 may multiplex the first wavelength $\lambda_T$, the first group of wavelengths ($\lambda_{TW1}, \ldots, \lambda_{TWn}$) and the second group of wavelengths ($\lambda_{W1}, \ldots, \lambda_{Wn}$), and may transmit the result of the multiplexing to the TDM, TDM/WDM, and WDM radio stations 180, 190, and 200 via the optical fiber 160. For example, the multiplexing unit 150 may multiplex one or more received signals with various wavelengths, and may output a signal obtained by the multiplexing.

The division unit 170 may divide a multiplexed signal that is received from the multiplexing unit 150 via the optical fiber 160 into one or more wavelengths or wavelength groups, and may transmit the wavelengths or the wavelength groups to the TDM, TDM/WDM, and WDM radio stations 180, 190, and 200 according to their respective transmission methods. For example, the division unit 170 may divide the multiplexed signal into the first wavelength $\lambda_T$, the first group of wavelengths ($\lambda_{TW1}, \ldots, \lambda_{TWn}$) and the second group of wavelengths ($\lambda_{W1}, \ldots, \lambda_{Wn}$). In this example, the division unit 170 may transmit a signal with the first wavelength $\lambda_T$ to the TDM radio station 180, may transmit signals with the first group of wavelengths ($\lambda_{TW1}, \ldots, \lambda_{TWn}$) to the TDM/WDM radio station 190, and may transmit signals with the second group of wavelengths ($\lambda_{W1}, \ldots, \lambda_{Wn}$) to the WDM radio station 200. For example, the division unit 170 may be a demultiplexer or a splitter.

Each of the TDM, TDM/WDM, and WDM radio stations 180, 190, and 200 may include a time-division control unit or a radio unit. The radio unit may be installed in a base station. The TDM, TDM/WDM, and WDM radio stations 180, 190, and 200 may transmit input data to the outside thereof based on transmission method information and synchronization information included in the input data. The time-division control unit may control the input data to be transmitted in a given time slot based on the synchronization information. The radio unit may convert an input digital signal into an analog signal, and may transmit the analog signal to the outside thereof. For example, the analog signal may be amplified by an amplifier, and the amplified analog signal may be transmitted to the outside of the radio unit via an antenna (not shown).

The TDM radio station 180 may transmit input data to the outside thereof using TDM.

The TDM/WDM radio station 190 may transmit part of input data to the outside thereof using TDM and may transmit the rest of the input data to the outside thereof using WDM.

The WDM radio station 200 may transmit input data to the outside thereof using WDM.

The TDM, TDM/WDM, and WDM radio stations 180, 190, and 200 are further described with reference to FIG. 2.

In the example illustrated in FIG. 1, the data transmission apparatus 100 may use one or more transmission methods individually or together, thereby improving the use of resources and providing great flexibility in the configuration of network topology.

In the example illustrated in FIG. 1, the data transmission apparatus 100 may facilitate the multiplexing of wavelengths, thereby reducing the cost of installing, maintaining and repairing optical cables.

In the example illustrated in FIG. 1, the data transmission apparatus 100 may guarantee high radio transmission speed for a radio station, may simplify the fabrication of a radio station, and may thus reduce the manufacturing cost of a radio station.

Figure 2:
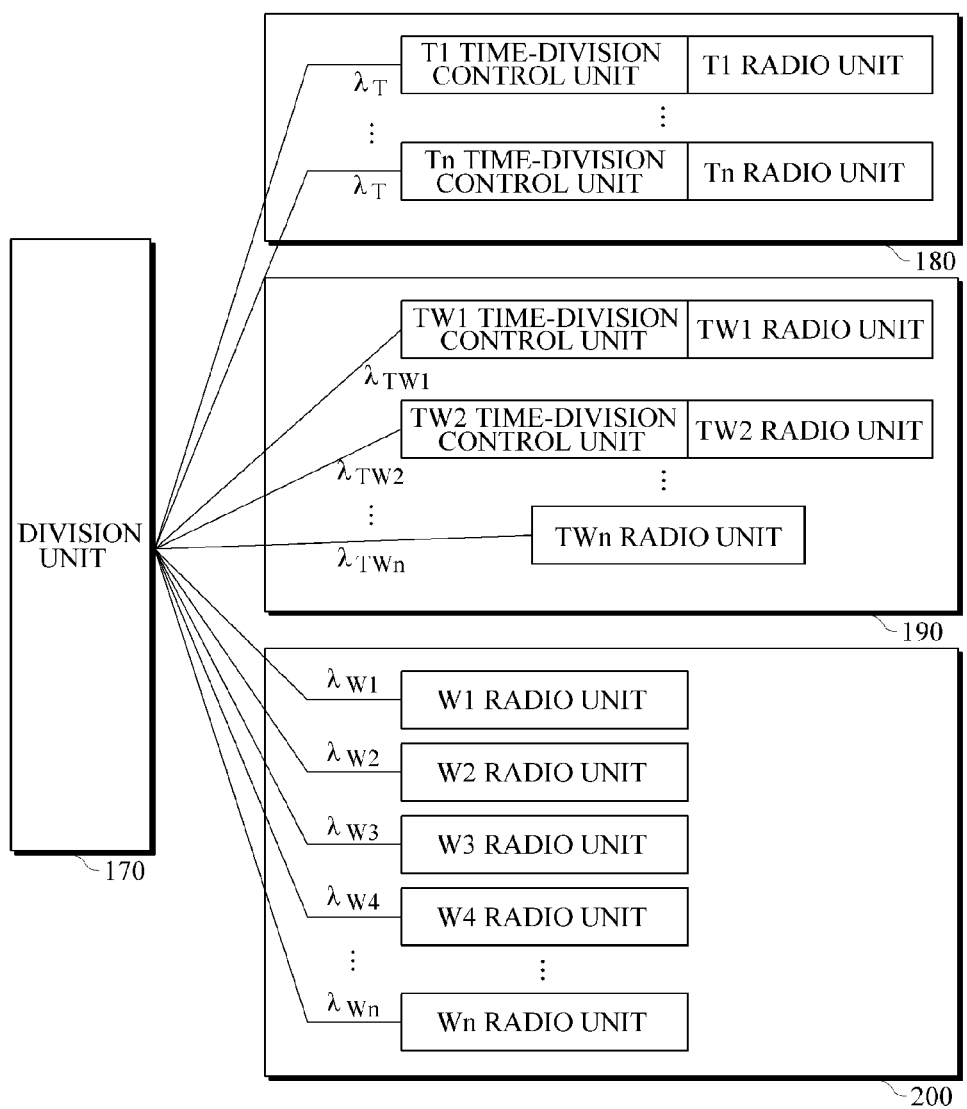
FIG. 2 is a diagram illustrating examples of TDM, TDM/WDM, and WDM radio stations illustrated in FIG. 1.

FIG. 2 illustrates examples of the TDM, TDM/WDM, and WDM radio stations 180, 190, and 200.

Referring to FIGS. 1 and 2, the division unit 170 may divide an input signal that is received from the multiplexing unit 150 via the optical fiber 160 into one or more wavelengths or wavelength groups, and may transmit the wavelengths or the wavelength groups to the TDM, TDM/WDM, and WDM radio stations 180, 190, and 200 according to their respective transmission methods. For example, the division unit 170 may divide the input signal into the first wavelength $\lambda_T$, the first group of wavelengths ($\lambda_{TW1}, \ldots, \lambda_{TWn}$) and the second group of wavelengths ($\lambda_{W1}, \ldots, \lambda_{Wn}$).

The division unit 170 may transmit a signal with the first wavelength $\lambda_T$ to the TDM radio station 180. The TDM radio station 180 may transmit an input signal provided by the division unit 170 to the outside thereof using TDM. For example, a T1 time-division control unit may control an input signal provided by the division unit 170 to be transmitted in a given time slot based on synchronization information included in the input signal, and a T1 radio unit may convert data included in the input signal into an analog signal, and may transmit the analog signal to the outside of the TDM radio station 180. For example, a Tn time-division control unit may control an input signal provided by the division unit 170 to be transmitted in a given time slot based on synchronization information included in the input signal, and a Tn radio unit may convert data included in the input signal into an analog signal, and may transmit the analog signal to the outside of the TDM radio station 180.

The division unit 170 may transmit signals with the first group of wavelengths ($\lambda_{TW1}, \ldots, \lambda_{TWn}$) to the TDM/WDM radio station 190. The TDM/WDM radio station 190 may transmit some of the signals with the first group of wavelengths ($\lambda_{TW1}, \ldots, \lambda_{TWn}$) to the outside thereof using TDM, and may transmit the rest of the signals with the first group of wavelengths ($\lambda_{TW1}, \ldots, \lambda_{TWn}$) to the outside thereof using WDM. For example, the TDM/WDM radio station 190 may process signals with wavelengths $\lambda_{TW1}$ and $\lambda_{TW2}$ using TDM, and may process signals with wavelengths $\lambda_{TW3}$ to $\lambda_{TWn}$ using WDM. In this example, the signal with the wavelength $\lambda_{TW1}$ may be processed by a TW1 time-division control unit and a TW1 radio unit, and the signal with the wavelength $\lambda_{TW2}$ may be processed by a TW2 time-division control unit and a TW2 radio unit. The signals with the wavelengths $\lambda_{TW1}$ and $\lambda_{TW2}$ may be transmitted to the outside of the TDM/WDM radio station 190 using TDM. The signals with the wavelengths $\lambda_{TW3}$ to $\lambda_{TWn}$ may be processed by TW3 to TWn radio units, respectively, and may be transmitted to the outside of the TDM/WDM radio station 190 using WDM.

The division unit 170 may transmit signals with the second group of wavelengths ($\lambda_{W1}, \ldots, \lambda_{Wn}$) to the WDM radio station 200. The WDM radio station 200 may transmit the signals with the second group of wavelengths ($\lambda_{W1}, \ldots, \lambda_{Wn}$)

to the outside thereof using WDM. For example, the signals with the second group of wavelengths ($\lambda_{W1}, \ldots, \lambda_{Wn}$) may be processed by W1 through Wn radio units, respectively, and may be transmitted to the outside of the WDM radio station 200 using WDM.

FIG. 3 illustrates an example of a data transmission method for use in a separate-type base station.

Referring to FIG. 3, in 300, a data transmission apparatus for use in a separate-type base station may generate first data that includes transmission method information indicating a selected transmission method and data to be transmitted. For example, the data transmission apparatus may generate as the first data at least one of TDM data, which includes transmission method information indicating TDM, TDM/WDM data, which includes transmission method information indicating both TDM and WDM, and WDM data, which includes transmission method information indicating WDM.

In 310, the data transmission apparatus determines whether the selected transmission method is TDM. In 320, in response to the selected transmission method being TDM, the apparatus may generate second data by including synchronization information for transmitting the first data using TDM in the first data. For example, the data transmission apparatus may include the synchronization information in the TDM data and the TDM/WDM data.

In 330, the data transmission apparatus may convert at least one of the first data and the second data into one or more wavelength optical signals using a predefined wavelength or a predefined group of wavelengths, and may transmit the wavelength optical signals. For example, the data transmission apparatus may transmit the TDM data to a radio station using a first wavelength, may transmit the TDM/WDM data to another radio station using a first group of wavelengths, and may transmit the WDM data to yet another radio station using a second group of wavelengths.

In 340, the data transmission apparatus may multiplex the wavelength optical signals, and may transmit a multiplexed wavelength optical signal obtained by multiplexing the wavelength optical signals to one or more radio stations via an optical fiber. In 350, the data transmission apparatus may divide the multiplexed wavelength optical signal into one or more wavelengths. In 360, the data transmission apparatus may transmit the wavelengths obtained by dividing the multiplexed wavelength optical signal to the radio stations. For example, the radio stations may include at least one of a TDM radio station, a TDM/WDM radio station, and a WDM radio station. For example, the data transmission apparatus may divide a wavelength optical signal into one or more wavelengths (for example, a first wavelength, a first group of wavelengths, and a second group of wavelengths). In this example, the data transmission apparatus may transmit the first wavelength to a TDM radio station, may transmit the first group of wavelengths to the TDM/WDM radio station, and may transmit the second group of wavelengths to the WDM radio station.

In the example illustrated in FIG. 3, one or more transmission methods may be used individually or together, thereby improving the use of resources and providing great flexibility in the configuration of network topology The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data transmission apparatus for use in a separate-type base station, the data transmission apparatus comprising:
    a digital unit configured to generate first data that includes transmission method information indicating a selected transmission method and data to be transmitted;
    a time-division synchronization control unit configured to, in response to the selected transmission method being time-division multiplexing (TDM), generate second data by including synchronization information for transmitting the first data using TDM in the first data; and
    a wavelength conversion unit configured to convert at least one of the first data and the second data into one or more wavelength optical signals using a predefined wavelength or a predefined group of wavelengths and transmit the wavelength optical signals to one or more radio stations,
    wherein the digital unit is further configured to, in response to a selection signal being received via a user input unit, generate at least one of TDM data, which includes transmission method information indicating TDM, TDM/WDM data, which includes transmission method information indicating both TDM and WDM, and WDM data, which includes transmission method information indicating WDM, as the first data based on the selection signal.

2. The data transmission apparatus of claim 1, wherein the time-division synchronization control unit is further configured to include the synchronization information in the TDM data and the TDM/WDM data.

3. The data transmission apparatus of claim 1, wherein the wavelength conversion unit is further configured to transmit the TDM data using a first wavelength, transmit the TDM/WDM data using a first group of wavelengths, and transmit the WDM data using a second group of wavelengths.

4. The data transmission apparatus of claim 1, further comprising:
a multiplexing unit configured to multiplex the wavelength optical signals and transmit a multiplexed wavelength optical signal obtained by the multiplexing the wavelength optical signals to the radio stations.

5. The data transmission apparatus of claim 1, further comprising:
a division unit configured to receive the multiplexed wavelength optical signal from the multiplexing unit, divide the multiplexed wavelength optical signal into one or more wavelengths, and transmit the wavelengths to the radio stations.

6. The data transmission apparatus of claim 5, wherein the division unit is a demultiplexer or a splitter.

7. The data transmission apparatus of claim 1, wherein the radio stations comprise at least one of a TDM radio station, a TDM/WDM radio station, and a WDM radio station.

8. The data transmission apparatus of claim 7, further comprising:
a division unit configured to receive the multiplexed wavelength optical signal from the multiplexing unit, divide the multiplexed wavelength optical signal into a first wavelength, a first group of wavelengths and a second group of wavelengths, and transmit the first wavelength, the first group of wavelengths, and the second group of wavelengths to the TDM radio station, the TDM/WDM radio station, and the WDM radio station, respectively.

9. A data transmission apparatus for use in a separate-type base station, the data transmission method comprising:
generating first data that includes transmission method information indicating a selected transmission method and data to be transmitted;
in response to the selected transmission method being TDM, generating second data by including synchronization information for transmitting the first data using TDM in the first data; and
converting at least one of the first data and the second data into one or more wavelength optical signals using a predefined wavelength or a predefined group of wavelengths and transmit the wavelength optical signals to one or more radio stations,
wherein the generating of the first data comprises, in response to a selection signal being received via a user input unit, generating at least one of TDM data, which includes transmission method information indicating TDM, TDM/WDM data, which includes transmission method information indicating both TDM and WDM, and WDM data, which includes transmission method information indicating WDM, as the first data based on the selection signal.

10. The data transmission method of claim 9, wherein the generating of the second data comprises including the synchronization information in the TDM data and the TDM/WDM data.

11. The data transmission method of claim 9, wherein the converting of the at least one of the first data and the second data comprises transmitting the TDM data using a first wavelength, transmitting the TDM/WDM data using a first group of wavelengths, and transmitting the WDM data using a second group of wavelengths.

12. The data transmission method of claim 9, further comprising:
multiplexing the wavelength optical signals and transmitting a multiplexed wavelength optical signal obtained by the multiplexing the wavelength optical signals to the radio stations.

13. The data transmission method of claim 9, further comprising:
dividing the multiplexed wavelength optical signal into one or more wavelengths; and
transmitting the wavelengths to the radio stations.

14. The data transmission method of claim 9, wherein the radio stations comprise at least one of a TDM radio station, a TDM/WDM radio station, and a WDM radio station.

15. The data transmission method of claim 14, further comprising:
dividing the multiplexed wavelength optical signal into a first wavelength, a first group of wavelengths and a second group of wavelengths, and transmitting the first wavelength, the first group of wavelengths, and the second group of wavelengths to the TDM radio station, the TDM/WDM radio station, and the WDM radio station, respectively.

* * * * *